United States Patent
Kobayashi et al.

(10) Patent No.: US 7,521,517 B2
(45) Date of Patent: Apr. 21, 2009

(54) METHOD FOR PRODUCING CARBOXYL GROUP-CONTAINING WATER-SOLUBLE POLYMER

(75) Inventors: Shinji Kobayashi, Himeji (JP);
Masatoyo Yoshinaka, Himeji (JP);
Yuichiro Morimitsu, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 11/572,590

(22) PCT Filed: Jul. 27, 2005

(86) PCT No.: PCT/JP2005/013742

§ 371 (c)(1),
(2), (4) Date: Mar. 15, 2007

(87) PCT Pub. No.: WO2006/011516

PCT Pub. Date: Feb. 2, 2006

(65) Prior Publication Data

US 2007/0225522 A1 Sep. 27, 2007

(30) Foreign Application Priority Data

Jul. 28, 2004 (JP) .............................. 2004-220600

(51) Int. Cl.
*C08F 20/06* (2006.01)
*C08F 20/02* (2006.01)
*C08F 2/06* (2006.01)
(52) U.S. Cl. ..................... 526/317.1; 526/318.3; 526/89
(58) Field of Classification Search ............... 526/317.1, 526/318.3, 89
See application file for complete search history.

(56) References Cited

U.S. PATENT DOCUMENTS

| | | | |
|---|---|---|---|
| 2,923,692 A | 2/1960 | Ackerman et al. | |
| 2,958,679 A | 11/1960 | Jones et al. | |
| 3,426,004 A | 2/1969 | Wagner et al. | |
| 4,509,949 A | 4/1985 | Huang et al. | |
| 4,923,940 A | 5/1990 | Hsu | |
| 4,996,274 A | 2/1991 | Hsu | |
| 5,342,911 A | 8/1994 | Bresciani | |
| 5,663,253 A | 9/1997 | Russo et al. | |
| 6,291,636 B1 * | 9/2001 | Miyake et al. ........... | 528/502 C |
| 2002/0013394 A1 * | 1/2002 | Dairoku et al. ............. | 524/109 |
| 2003/0235686 A1 * | 12/2003 | Caspari et al. .............. | 428/343 |

FOREIGN PATENT DOCUMENTS

| | | |
|---|---|---|
| JP | 58084819 | 5/1983 |
| JP | 59232107 | 12/1984 |
| JP | 1217017 | 8/1989 |
| JP | 6322340 | 11/1994 |
| JP | 6-345825 | 12/1994 |
| JP | 6345825 | 12/1994 |
| JP | 11124552 | 5/1999 |
| JP | 2004-331865 | 11/2004 |
| JP | 2004331865 | 11/2004 |

* cited by examiner

*Primary Examiner*—Vasu Jagannathan
*Assistant Examiner*—Karuna P Reddy
(74) *Attorney, Agent, or Firm*—Leydig, Voit & Mayer, Ltd.

(57) ABSTRACT

A first object of the present invention is to provide a method for producing a carboxyl group-containing water-soluble polymer capable of giving neutralized viscous solutions excellent in thickening effect even when the aqueous solutions of the carboxyl group-containing water-soluble polymer have a low concentration. A second object of the invention is to provide a method for producing a carboxyl group-containing water-soluble polymer capable of giving neutralized viscous solutions excellent in thickening effect at low concentration levels and, at the same time, capable of being dispersed and dissolved in water at high concentrations with ease.

The prevent invention is a method for producing a carboxyl group-containing water-soluble polymer by reacting an α,β-unsaturated carboxylic acid and a compound having two or more ethylenically unsaturated groups in the presence of a radical polymerization initiator, which method is characterized in that the reaction is carried out in the presence of a (meth)acrylic acid derivative represented by the general formula (1):

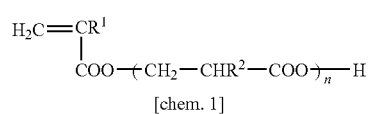

[chem. 1]

(1)

(in the formula, $R^1$ and $R^2$ each independently represents a hydrogen atom or a methyl group and n represents 1 or 2).

8 Claims, No Drawings

METHOD FOR PRODUCING CARBOXYL GROUP-CONTAINING WATER-SOLUBLE POLYMER

TECHNICAL FIELD

The present invention relates to a method for producing carboxyl group-containing water-soluble polymers. More particularly, it relates to a method for producing carboxyl group-containing water-soluble polymers which can suitably be used as thickening agents for cosmetics and the like, as humectants for cataplasms, as suspension stabilizers for emulsions, suspensions and the like, among others.

BACKGROUND ART

Known as carboxyl group-containing water-soluble polymers are, for example, copolymers of an α,β-unsaturated carboxylic acid such as acrylic acid and a polyallyl ether (cf. e.g. Patent Document 1), copolymers of an α,β-unsaturated carboxylic acid and hexaallyl-trimethylene-trisulfone (cf. e.g. Patent Document 2), copolymers of an α,β-unsaturated carboxylic acid and triallyl phosphate (cf. e.g. Patent Document 3), copolymers of an α,β-unsaturated carboxylic acid and glycidyl methacrylate or the like (cf. e.g. Patent Document 4), an α,β-unsaturated carboxylic acid such as acrylic acid and a pentaerythritol allyl ether (cf. e.g. Patent Document 5; Patent Document 6 and Patent Document 7) and copolymers of an α,β-unsaturated carboxylic acid such as acrylic acid, a (meth)acrylic acid alkyl ester and a pentaerythritol allyl ether (cf. e.g. Patent Document 8), among others. These carboxyl group-containing water-soluble polymers are used, after dissolution in water and neutralization with an alkali to give viscous liquids, in such fields of application as thickening agents for cosmetics and the like, humectants for cataplasms and the like, and suspension stabilizers for emulsions, suspensions and the like, among others.

In using the carboxyl group-containing water-soluble polymers mentioned above in these fields of application, it is necessary to first prepare a uniform aqueous solution of any of the carboxyl group-containing water-soluble polymers and then neutralize the same to give a neutral viscous liquid. However, the carboxyl group-containing water-soluble polymers mentioned above each generally occurs as a fine powder and, therefore, undissolved lumps are readily formed on the occasion of dissolution thereof in water. Once undissolved lumps are formed, a gel-like layer is formed on the surface of each lump, so that the rate of penetration of water into the inside thereof is reduced and it becomes difficult to obtain a uniform aqueous solution; this is a drawback.

Therefore, in preparing an aqueous solution of a carboxyl group-containing water-soluble polymer, a procedure consisting in gradually adding the carboxyl group-containing water-soluble polymer powder to water with high-speed stirring is required; this procedure is poor in production efficiency and, in some instances, a special dissolution apparatus is required for preventing the formation of undissolved lumps. Furthermore, from the production efficiency improvement viewpoint, it is a recent trend in dissolution technique to disperse and dissolve the carboxyl group-containing water-soluble polymer in advance at a high concentration and then dilute the resulting solution for use.

On the other hand, in the field of cosmetics and the like, there is a tendency toward decreasing the carboxyl group-containing water-soluble polymer addition level to improve the texture of cosmetics and the like. Therefore, a carboxyl group-containing water-soluble polymer capable of giving a neutralized viscous aqueous solution excellent in thickening effect at lower concentrations is desired.

Patent Document 1: U.S. Pat. No. 2,923,692
Patent Document 2: U.S. Pat. No. 2,958,679
Patent Document 3: U.S. Pat. No. 3,426,004
Patent Document 4: Japanese Kokai Publication S58-84819
Patent Document 5: U.S. Pat. No. 5,342,911
Patent Document 6: U.S. Pat. No. 5,663,253
Patent Document 7: U.S. Pat. No. 4,996,274
Patent Document 8: Japanese Kokai Publication S59-232107

DISCLOSURE OF THE INVENTION

Problems which the Invention is to Solve

A first object of the present invention is to provide a method for producing a carboxyl group-containing water-soluble polymer capable of giving neutralized viscous solutions excellent in thickening effect even when the aqueous solutions of the carboxyl group-containing water-soluble polymer have a low concentration. A second object of the invention is to provide a method for producing a carboxyl group-containing water-soluble polymer capable of giving neutralized viscous solutions excellent in thickening effect at low concentration levels and, at the same time, capable of being dispersed and dissolved in water at high concentrations with ease.

Means for Solving the Object

Thus, the invention relates to a method for producing a carboxyl group-containing water-soluble polymer by reacting an α,β-unsaturated carboxylic acid and a compound having two or more ethylenically unsaturated groups in the presence of a radical polymerization initiator, which method is characterized in that the reaction is carried out in the presence of a (meth)acrylic acid derivative represented by the general formula (1):

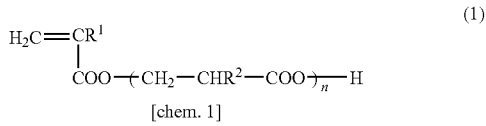

[chem. 1]

(in the formula, $R^1$ and $R^2$ each independently represents a hydrogen atom or a methyl group and n represents 1 or 2).

The reaction involved in the above-mentioned method for producing carboxyl group-containing water-soluble polymers is preferably carried out in an inert solvent.

The carboxyl group-containing water-soluble polymers obtained by the above-mentioned production method according to the invention are carboxyl group-containing water-soluble polymers giving neutralized viscous solutions thereof showing a viscosity of 20000 to 50000 mPa·s when the concentration thereof is 0.2% by weight.

The above-mentioned production method comprising carrying out the reaction in an inert solvent according to the invention provides carboxyl group-containing water-soluble polymers having a median particle diameter of 75 to 500 μm.

In the following, the invention is described in detail.

The first object of the invention which is directed to a method for producing carboxyl group-containing water-soluble polymers by reacting an α,β-unsaturated carboxylic acid with a compound having two or more ethylenically unsaturated groups in the presence of a radical polymerization initiator is accomplished by carrying out the reaction in the presence of a (meth)acrylic acid derivative represented by the general formula (1) given above.

In the above general formula (1), $R^1$ and $R^2$ each independently represents a hydrogen atom or a methyl group, and n represents 1 or 2. The term "(meth)acrylic" means "acrylic" or "methacrylic".

In accordance with the invention, carboxyl group-containing water-soluble polymers capable of giving neutralized viscous solutions excellent in thickening effect even when the concentrations of the carboxyl group-containing water-soluble polymers in aqueous solutions thereof are low can be produced by carrying out the reaction in the presence of such a (meth)acrylic acid derivative.

As typical examples of the (meth)acrylic acid derivative, there may be mentioned 3-(acryloyloxy) propionic acid, 3-(methacryloyloxy)propionic acid, 3-(acryloyloxy)-2-methylpropionic acid, 3-(methacryloyloxy)-2-methylpropionic acid, 3-[3-(acryloyloxy)propionyloxy]propionic acid and 3-[3-(methacryloyloxy)-2-methylpropionyloxy]-2-methylpropionic acid, among others. Among them, 3-(acryloyloxy) propionic acid is preferred from the viewpoint of ready commercial availability.

The (meth)acrylic acid derivative is used in an amount of 0.01 to 10 parts by weight, preferably 0.05 to 5 parts by weight, more preferably 0.1 to 3 parts by weight, per 100 parts by weight of the $\alpha,\beta$-unsaturated carboxylic acid. When the amount used of the (meth)acrylic acid derivative is smaller than 0.01 part by weight, the use thereof will not produce any effect. When it exceeds 10 parts by weight, the effect is no longer proportional to the amount used; this is uneconomical.

The mode of addition of the (meth)acrylic acid derivative is not particularly restricted but the derivative may be added all at once, together with the $\alpha,\beta$-unsaturated carboxylic acid prior to polymerization or may be added in a plurality of divided portions during polymerization.

The $\alpha,\beta$-unsaturated carboxylic acid to be used in the practice of the invention is not particularly restricted but includes, among others, acrylic acid, methacrylic acid, crotonic acid, maleic acid, fumaric acid, itaconic acid, citraconic acid and mesaconic acid.

The amount of the $\alpha,\beta$-unsaturated carboxylic acid is desirably 6 to 25 parts by volume, preferably 8 to 22 parts by volume, more preferably 13 to 20 parts by volume, per 100 parts by volume of the solvent, which is described later herein. When the amount of the $\alpha,\beta$-unsaturated carboxylic acid is smaller than 6 parts by volume, the carboxyl group-containing water-soluble polymer obtained may give neutralized viscous solutions unsatisfactory in transparency. When the amount of the $\alpha,\beta$-unsaturated carboxylic acid is larger than 25 parts by volume, the carboxyl group-containing water-soluble polymer will precipitate out with the progress of the reaction, possibly making it difficult to uniformly stir the reaction mixture.

In the practice of the invention, the above-mentioned $\alpha,\beta$-unsaturated carboxylic acid may be used in combination with an $\alpha,\beta$-unsaturated carboxylic acid alkyl ester. The $\alpha,\beta$-unsaturated carboxylic acid alkyl ester is not particularly restricted but includes, among others, methyl acrylate, ethyl acrylate, n-propyl acrylate, isopropyl acrylate, n-butyl acrylate, isobutyl acrylate, pentyl acrylate, hexyl acrylate, 2-ethylhexyl acrylate, octyl acrylate, nonyl acrylate, n-decyl acrylate, lauryl acrylate, myristyl acrylate, palmityl acrylate, stearyl acrylate, behenyl acrylate, methyl methacrylate, ethyl methacrylate, n-propyl methacrylate, isopropyl methacrylate, n-butyl methacrylate, isobutyl methacrylate, pentyl methacrylate, hexyl methacrylate, 2-ethylhexyl methacrylate, octyl methacrylate, nonyl methacrylate, n-decyl methacrylate, lauryl methacrylate, myristyl methacrylate, palmityl methacrylate, stearyl methacrylate and behenyl methacrylate. Among them, lauryl methacrylate, stearyl methacrylate and behenyl methacrylate are preferred since they are inexpensive and readily available and can contribute toward giving carboxyl group-containing water-soluble polymers capable of giving neutralized viscous solutions excellent in transparency.

In cases where such an $\alpha,\beta$-unsaturated carboxylic acid alkyl ester is used in combination with the $\alpha,\beta$-unsaturated carboxylic acid, the proportion of the $\alpha,\beta$-unsaturated carboxylic acid alkyl ester is smaller than 10 mole percent, preferably smaller than 5 mole percent, relative to the $\alpha,\beta$-unsaturated carboxylic acid from the viewpoint of avoiding the possibility of the resulting carboxyl group-containing water-soluble polymer becoming less soluble in water.

The compound having two or more ethylenically unsaturated groups, which is to be used in the practice of the invention, is not particularly restricted but includes, among others, acrylic acid esters of polyols such as ethylene glycol, propylene glycol, diethylene glycol, dipropylene glycol, polyethylene glycol, polypropylene glycol, glycerol, polyglycerol, trimethylolpropane, pentaerythritol, saccharose and sorbitol; methacrylic acid esters of such polyols; allyl ethers of these polyols; diallyl phthalate, triallyl phosphate, allyl methacrylate, triallyl cyanurate, divinyl adipate, vinyl crotonate, 1,5-hexadiene and divinylbenzene. These may be used singly or two or more of them may be used in combination. From the viewpoint that neutralized, highly viscous solutions of the resulting carboxyl group-containing water-soluble polymer can be obtained and they can provide emulsions, suspensions and the like with high levels of suspension stability, pentaerythritol allyl ethers, diethylene glycol diallyl ether, polyethylene glycol diallyl ether and polyallylsaccharose are preferred among others.

The compound having two or more ethylenically unsaturated groups is desirably used in an amount of 0.15 to 2 parts by weight, preferably 0.3 to 1.5 parts by weight, per 100 parts by weight of the $\alpha,\beta$-unsaturated carboxylic acid. When the amount of the compound having two or more ethylenically unsaturated groups is smaller than 0.15 part by weight, there arises the possibility of neutralized solutions derived from the resulting carboxyl group-containing water-soluble polymer, which are to be viscous, showing reductions in viscosity. When the amount of the compound having two or more ethylenically unsaturated groups is above 2 parts by weight, there arises the possibility of an insoluble gel being readily formed in neutralized viscous solutions obtained from the resulting carboxyl group-containing water-soluble polymer.

The radical polymerization initiator to be used in the practice of the invention is not particularly restricted but includes, among others, $\alpha,\alpha'$-azoisobutyronitrile, 2,2'-azobis(2,4-dimethylvaleronitrile), 2,2'-azobis(methyl isobutyrate), benzoyl peroxide, lauroyl peroxide, cumene hydroperoxide and tert-butyl hydroperoxide. Among them $\alpha,\alpha'$-azoisobutyronitrile is preferred in view of its easy handleability and good stability.

The radical polymerization initiator is desirably used in an amount of 0.00003 to 0.002 mole per mole of the $\alpha,\beta$-unsaturated carboxylic acid. When the amount of the radical polymerization initiator is smaller than 0.00003 mole, the rate of reaction becomes slow possibly with economic disadvantage. When the amount of the radical polymerization initiator is greater than 0.002 mole, the polymerization proceeds violently, so that heat removal may become difficult and it may become difficult to control the reaction.

The reaction among the α,β-unsaturated carboxylic acid, the compound having two or more ethylenically unsaturated groups and the (meth)acrylic acid derivative is preferably carried out in a solvent. The solvent to be used in the practice of the invention is preferably one capable of dissolving the α,β-unsaturated carboxylic acid and the compound having two or more ethylenically unsaturated groups but incapable of dissolving the carboxyl group-containing water-soluble polymer produced. The solvent may be one incapable of dissolving the (meth)acrylic acid derivative or one capable of dissolving the (meth)acrylic acid derivative. The "solvent" so referred to herein conceptually includes those inert solvents which are described later herein.

As the solvent, there may be mentioned, for example, open-chain hydrocarbons such as normalpentane, normalhexane, isohexane, normalheptane, normaloctane and isooctane; alicylcic hydrocarbons such as cyclopentane, methylcyclopentane, cyclohexane and methylcyclohexane; aromatic hydrocarbons such as benzene, toluene, xylene and chorobenzene; halogenated hydrocarbons such as ethylene dichloride; esters such as ethyl acetate and isopropyl acetate; and ketones such as methyl ethyl ketone and methyl isobutyl ketone, among others. These may be used singly or in combination of two or more.

The atmosphere in which the α,β-unsaturated carboxylic acid, the compound having two or more ethylenically unsaturated groups and the (meth)acrylic acid derivative are to be reacted with one another by the method for producing carboxyl group-containing water-soluble polymers according to the invention is preferably a nitrogen gas, argon gas or like atmosphere, among others.

The reaction temperature is desirably 50 to 90° C., preferably 55 to 75° C. At reaction temperatures lower than 50° C., the viscosity of the liquid reaction mixture increases, possibly resulting in difficulty in uniform stirring. At reaction temperatures exceeding 90° C., the reaction proceeds so rapidly that the reaction may possibly become uncontrollable. The reaction time cannot be absolutely specified since it depends on the reaction temperature. Generally, however, it is 0.5 to 5 hours.

After completion of the reaction, the reaction mixture is heated to 80 to 130° C. to thereby distill off the solvent, whereupon the desired carboxyl group-containing water-soluble polymer can be obtained in the form of white granules or a fine powder. When the heating temperature is lower than 80° C., a long period of time may be required for drying. At heating temperatures exceeding 130° C., the carboxyl group-containing water-soluble polymer obtained may be deteriorated in solubility.

The method for preparing a neutralized viscous solution using the carboxyl group-containing water-soluble polymer obtained is not particularly restricted but may comprise, for example, dissolving the carboxyl group-containing water-soluble polymer in water to a concentration of 0.01 to 3% by weight, followed by neutralization to a pH of 6.5 to 7.5 with an alkali, for example an alkali metal hydroxide such as sodium hydroxide or an amine such as triethanolamine or diisopropanolamine.

The neutralized viscous solution of the carboxyl group-containing water-soluble polymer obtained by the production method according to the invention, when it has a concentration of 0.2% by weight, preferably has a viscosity of 20000 to 50000 mPa·s, more preferably 22000 to 40000 mPa·s, still more preferably 24000 to 35000 mPa·s. When the viscosity of the neutralized viscous solution is lower than 20000 mPa·s, the thickening effect cannot be produced in preparing cosmetics and the like, possibly resulting in deterioration in texture of cosmetics and the like. When the viscosity is higher than 50000 mPa·s, there is a tendency toward poor long-term stability against salts and light, among others.

The second object of the invention is accomplished by carrying out the reaction, which is involved in the method for producing carboxyl group-containing water-soluble polymers by reacting an α,β-unsaturated carboxylic acid and a compound having two or more ethylenically unsaturated groups in the presence of a radical polymerization initiator, especially in an inert solvent. Thus, in a preferred mode thereof, the method for producing carboxyl group-containing water-soluble polymers according to the invention comprises, in producing carboxyl group-containing water-soluble polymers by reacting an α,β-unsaturated carboxylic acid with a compound having two or more ethylenically unsaturated groups in the presence of a radical polymerization initiator, carrying out the reaction in the presence of a (meth)acrylic acid derivative represented by the general formula (1) given hereinabove in an inert solvent.

By carrying out the above reaction in an inert solvent, it becomes possible to produce carboxyl group-containing water-soluble polymers capable of giving neutralized viscous solutions excellent in thickening effect in spite of their being low-concentration aqueous solutions and at the same time capable of being readily dispersed and dissolved in water even to high concentrations.

The "inert solvent" so referred to herein is a solvent capable of dissolving the α,β-unsaturated carboxylic acid and the compound having two or more ethylenically unsaturated groups but incapable of dissolving the (meth)acrylic acid derivative and the carboxyl group-containing water-soluble polymer produced.

As the inert solvent, there may be mentioned, for example, open-chain hydrocarbons such as normalpentane, normalhexane, isohexane, normalheptane, normaloctane and isooctane; and alicylcic hydrocarbons such as cyclopentane, methylcyclopentane, cyclohexane and methylcyclohexane, among others. These may be used singly or in combination of two or more. Among them, open-chain hydrocarbons are preferred and normalhexane is particularly preferred because of the inexpensiveness and ready availability thereof.

When, in carrying out the method for producing carboxyl group-containing water-soluble polymers according to the invention, the above-mentioned reaction is carried out in an inert solvent, the atmosphere in which the α,β-unsaturated carboxylic acid, the compound having two or more ethylenically unsaturated groups and the (meth)acrylic acid derivative are to be reacted with one another is preferably a nitrogen gas, argon gas or like atmosphere, among others.

When the reaction mentioned above is carried out in an inert solvent, the reaction temperature is desirably 50 to 90° C., preferably 55 to 75° C. At reaction temperatures lower than 50° C., the viscosity of the reaction mixture solution increases, possibly resulting in difficulty in uniform stirring. At reaction temperatures exceeding 90° C., the reaction proceeds so rapidly that the reaction may possibly become uncontrollable. The reaction time cannot be absolutely specified since it depends on the reaction temperature. Generally, however, it is 0.5 to 5 hours.

After completion of the reaction in inert solvent, the reaction mixture is heated to 80 to 130° C. to thereby distill off the solvent, whereupon the desired carboxyl group-containing water-soluble polymer can be obtained in the form of white particles. When the heating temperature is lower than 80° C., a long period of time may be required for drying. At heating temperatures exceeding 130° C., the carboxyl group-containing water-soluble polymer obtained may be deteriorated in solubility.

The thus-obtained carboxyl group-containing water-soluble polymer preferably has a median particle diameter of 75 to 500 μm, more preferably 100 to 350 μm. When the median particle diameter is smaller than 75 μm, the carboxyl group-containing water-soluble polymer may sometimes allow a dust fraction thereof to swirl up violently, rendering it difficult to handle; in addition, undissolved lumps are readily formed on the occasion of dispersing and dissolving the polymer in water at high concentrations. Conversely, when that diameter is greater than 500 μm, the hydration of the carboxyl group-containing water-soluble polymer with water tends to become slow and the time for dissolution is prolonged in some instances, leading to a reduction in productivity. From the viewpoint of preventing the formation of undissolved lumps, the above-mentioned carboxyl group-containing water-soluble polymer preferably consists of approximately spherical particles.

The term "median particle diameter" corresponds to the mesh size of that sieve on which the accumulated weight obtained by consecutively adding up the weights of the particles of the carboxyl group-containing water-soluble polymer remaining on larger mesh-sized sieves, including the weight of the particles on that sieve, in the classification of particles of the carboxyl group-containing water-soluble polymer using a series of sieves arrives at 50% by weight of the total weight of the particles of the carboxyl group-containing water-soluble polymer.

More specifically, 30 g of the carboxyl group-containing water-soluble polymer in the form of particles was weighed and placed on the top one of 7 standard sieves according to JIS Z 8801-1982 (a stack of 7 sieves, 850 μm, 500 μm, 300 μm, 250 μm, 180 μm, 106 μm and 75 μm in mesh size, and a receiving pan, from top to bottom), sieving was carried out by shaking the sieves using a Ro-Tap sieve shaker for 30 minutes and, then, the particles on each sieve was weighed. Based on the results thus obtained, the median particle diameter was calculated as follows:

$$\text{Median particle diameter}(\mu m) = [(15-A)/(C-A)] \times (D-B) + B$$

In the above formula, A is the accumulated value (g) obtained by consecutively adding up the weights of particles in order of decreasing particle diameter until the accumulated weight arrives at a level lower than 50% by weight but closest to 50% by weight, and B is the sieve opening (μm) of the sieve smallest in mesh size as involved in the calculation of the above accumulated weight. C is the accumulated value (g) obtained by consecutively adding up the weights of particles in order of decreasing particle diameter until the accumulated weight arrives at a level higher than 50% by weight but closest to 50% by weight, and D is the sieve opening (μm) of the sieve smallest in mesh size as involved in the calculation of the above accumulated weight.

In the practice of the invention, the carboxyl group-containing water-soluble polymer obtained by carrying out the reaction in an inert solvent is not always required to give a 0.2% by weight neutralized viscous solution having a viscosity of 20000 to 50000 mPa·s provided that it has a median particle diameter within the above range. It is preferred, however, that such solution have a viscosity within the above range.

Effects of the Invention

The neutralized viscous solution derived from the carboxyl group-containing water-soluble polymer obtained in accordance with the invention has an excellent thickening effect even when the concentration of that polymer is low, so that it becomes possible to improve the texture of cosmetics and the like at low addition levels. Further, the carboxyl group-containing water-soluble polymer obtained by carrying out the reaction in an inert solvent has a median particle of 75 to 500 μm and, therefore, that polymer can be dispersed and dissolved in water at high concentrations while preventing the formation of undissolved lumps thereof.

BEST MODE FOR CARRYING OUT THE INVENTION

The following examples and comparative example illustrate the invention in further detail. These examples are, however, by no means limitative of the scope of the invention.

EXAMPLE 1

A 500-mL four-necked flask equipped with a stirrer, thermometer, nitrogen inlet tube and condenser was charged with 40 g (0.56 mole, 38.1 mL) of acrylic acid, 1.2 g of 3-(acryloyloxy)-propionic acid (trademark of Toagosei Co., Ltd.: Aronix M-5600), 0.20 g of pentaerythritol allyl ether, 0.13 g (0.00079 mole) of α,α'-azobisisobutyronitrile and 177 g (264 mL) of normalhexane, followed by uniform stirring for mixing up. Thereafter, for removing the oxygen occurring in the reaction vessel upper space, raw materials and solvent, nitrogen gas was blown into the solution. Then, while the temperature was maintained at 55 to 60° C., the reaction was allowed to proceed in a nitrogen atmosphere for 4 hours. After completion of the reaction, the slurry formed was heated to 90° C. to distill off the normalhexane, whereupon 39 g of a carboxyl group-containing water-soluble polymer was obtained as white particles with a median particle diameter of 348 μm.

EXAMPLE 2

A 500-mL four-necked flask equipped with a stirrer, thermometer, nitrogen inlet tube and condenser was charged with 45 g (0.625 mole, 42.9 mL) of acrylic acid, 0.9 g of 3-(acryloyloxy)-propionic acid (trademark of Toagosei Co., Ltd.: Aronix M-5600), 0.40 g of diethylene glycol diallyl ether, 0.14 g (0.00085 mole) of α,α'-azobisisobutyronitrile and 150 g (224 mL) of normalhexane, followed by uniform stirring for mixing up. Thereafter, for removing the oxygen occurring in the reaction vessel upper space, raw materials and solvent, nitrogen gas was blown into the solution. Then, while the temperature was maintained at 55 to 60° C., the reaction was allowed to proceed in a nitrogen atmosphere for 4 hours. After completion of the reaction, the slurry formed was heated to 90° C. to distill off the normalhexane, whereupon 43 g of a carboxyl group-containing water-soluble polymer was obtained as white particles with a median particle diameter of 185 μm.

EXAMPLE 3

A 500-mL four-necked flask equipped with a stirrer, thermometer, nitrogen inlet tube and condenser was charged with 43 g (0.60 mole, 41.0 mL) of acrylic acid, 2 g (0.008 mole) of lauryl methacrylate, 0.23 g of pentaerythritol allyl ether, 0.14 g (0.00085 mole) of α,α'-azobisisobutyronitrile and 177 g (264 mL) of normalhexane, followed by uniform stirring for mixing up. Thereafter, for removing the oxygen occurring in the reaction vessel upper space, raw materials and solvent, nitrogen gas was blown into the solution. Then, while the temperature was maintained at 55 to 60° C., the reaction was allowed to proceed in a nitrogen atmosphere for 1 hour. Then, 0.9 g of 3-(acryloyloxy)-propionic acid (trademark of Toagosei Co., Ltd.: Aronix M-5600) was added to the reaction system, and the reaction was allowed to proceed for 3 hours. After completion of the reaction, the slurry formed was heated to 90° C. to distill off the normalhexane, whereupon 45 g of a carboxyl group-containing water-soluble polymer was obtained as white particles with a median particle diameter of 307 μm.

EXAMPLE 4

A 500-mL four-necked flask equipped with a stirrer, thermometer, nitrogen inlet tube and condenser was charged with 40 g (0.56 mole, 38.1 mL) of acrylic acid, 1.2 g of 3-(acryloyloxy)-propionic acid (trademark of Toagosei Co., Ltd.: Aronix M-5600), 0.20 g of pentaerythritol allyl ether, 0.01 g (0.00006 mole) of α,α'-azobisisobutyronitrile and 330 g (264 mL) of ethylene dichloride, followed by uniform stirring for mixing up. Thereafter, for removing the oxygen occurring in the reaction vessel upper space, raw materials and solvent, nitrogen gas was blown into the solution. Then, while the temperature was maintained at 70 to 75° C., the reaction was allowed to proceed in a nitrogen atmosphere for 4 hours. After completion of the reaction, the fine powder-based slurry formed was heated to 105° C. to distill off the ethylene dichloride, whereupon 41 g of a carboxyl group-containing water-soluble polymer was obtained as a white fine powder. The carboxyl group-containing water-soluble polymer obtained occurred as a fine powder and the whole quantity thereof passed through a standard sieve with a mesh size of 75 μm; therefore, the median particle diameter could not be determined.

COMPARATIVE EXAMPLE

A 500-mL four-necked flask equipped with a stirrer, thermometer, nitrogen inlet tube and condenser was charged with 40 g (0.56 mole, 38.1 mL) of acrylic acid, 0.20 g of pentaerythritol allyl ether, 0.16 g (0.001 mole) of α,α'-azobisisobutyronitrile and 177 g (264 mL) of normalhexane, followed by uniform stirring for mixing up. Thereafter, for removing the oxygen occurring in the reaction vessel upper space, raw materials and solvent, nitrogen gas was blown into the solution. Then, while the temperature was maintained at 60 to 65° C., the reaction was allowed to proceed in a nitrogen atmosphere for 4 hours. After completion of the reaction, the slurry formed was heated to 90° C. to distill off the normalhexane, whereupon 38 g of a carboxyl group-containing water-soluble polymer was obtained as a white fine powder. The carboxyl group-containing water-soluble polymer obtained occurred as a fine powder and the whole quantity thereof passed through a standard sieve with a mesh size of 75 μm; therefore, the median particle diameter could not be determined.

The carboxyl group-containing water-soluble polymer obtained in each of the examples and comparative example was evaluated for the viscosity and transparency of a neutralized viscous solution thereof and for the dispersibility thereof at a high concentration, as typical physical properties thereof, as follows.

(1) Viscosity of Neutralized Viscous Solution

Deionized water (493.4 g) and 1.0 g of the carboxyl group-containing water-soluble polymer were placed in a 1-liter glass beaker, the contents were stirred with a magnetic stirrer for 3 hours to thereby causing the carboxyl group-containing water-soluble polymer to be dissolved in the water. To the solution obtained was added 5.6 g of a 6% by weight aqueous solution of sodium hydroxide, and the mixture was stirred and mixed up with an S-shaped impeller according to CTFA (The Cosmetic, Toiletry and Fragrance Association) at a rate of 200 revolutions per minute for 1 hour. The thus-obtained 0.2% by weight neutralized viscous solution (pH 7.2) was subjected to viscosity measurement using a type BH rotational viscometer (rotor No. 6) under the conditions of 20 revolutions per minute and a temperature of 25° C.; the viscosity was measured after 60 seconds.

(2) Transparency of Neutralized Viscous Solution

A 1-liter glass beaker was charged with 483.3 g of deionized water and 2.5 g of the carboxyl group-containing water-soluble polymer, and the mixture was stirred with a magnetic stirrer for 3 hours for dissolution of the carboxyl group-containing water-soluble polymer. To the solution obtained was added 14.2 g of a 6% by weight aqueous solution of sodium hydroxide, the whole was stirred for mixing up with an S-shaped impeller according to CTFA at a rate of 200 revolutions per minute for 1 hour, and the 0.5% by weight neutralized viscous solution was placed in a cell (1 cm×1 cm) and subjected to transmittance measurement at the wavelength of 425 nm.

(3) Dispersibility at High Concentration

Deionized water (980 g) was placed in a 2-liter glass beaker (14 cm in diameter), and a homodisper (TK homodisper f model; product of Tokushu Kika Kogyo) was set at a speed of 2000 rotations per minute and disposed at a site slightly eccentric to the central axis of the beaker. The carboxyl group-containing water-soluble polymer (20 g) was thrown into the glass beaker at a site close to the inside wall thereof within 10 seconds, and the time required for dispersion of the carboxyl group-containing water-soluble polymer was measured and the occurrence or nonoccurrence of undissolved lumps was evaluated by the eye.

TABLE 1

| | Neutralized viscous solution | | Dispersibility at high concentration | |
|---|---|---|---|---|
| | Viscosity (mPa·s) | Transparency (%) | Time required for dispersion (min) | Occurrence or nonoccurrence of undissolved lumps |
| Example 1 | 26050 | 97 | 20 | Nonoccurrence |
| Example 2 | 28800 | 98 | 23 | Nonoccurrence |
| Example 3 | 26500 | 98 | 15 | Nonoccurrence |
| Example 4 | 25000 | 98 | >180 | Occurrence |
| Comparative Example | 16650 | 95 | >180 | Occurrence |

From Table 1, it is evident that the neutralized viscous solutions derived from the carboxyl group-containing water-soluble polymers obtained in Examples 1 to 4 each has a viscosity of 20000 mPa·s or higher even at a concentration as low as 0.2% by weight and, at the same time, is excellent in transparency. Further, it is evident that the carboxyl group-containing water-soluble polymers obtained in Examples 1 to 3 have good dispersibility at high concentrations.

INDUSTRIAL APPLICABILITY

The neutralized viscous solution derived from the carboxyl group-containing water-soluble polymer obtained in accordance with the invention has an excellent thickening effect even when the concentration of that polymer is low, so that it becomes possible to improve the texture of cosmetics and the like at low addition levels. Further, the carboxyl group-containing water-soluble polymer obtained by carrying out the reaction in an inert solvent has a median particle of 75 to 500 µm and, therefore, that polymer can be dispersed and dissolved in water at high concentrations while preventing the formation of undissolved lumps thereof.

The invention claimed is:

1. A method for producing a carboxyl group-containing water-soluble polymer comprising reacting an α, β-unsaturated carboxylic acid and a compound having two or more ethylenically unsaturated groups in the presence of a radical polymerization initiator,
wherein the reaction is carried out in an inert solvent which is incapable of dissolving the carboxyl group-containing water-soluble polymer produced and in the presence of a (meth)acrylic acid derivative represented by the general formula (1):

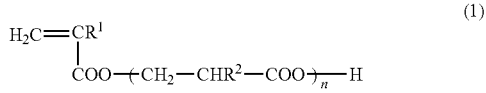

wherein $R^1$ and $R^2$ each independently represents a hydrogen atom or a methyl group and n represents 1 or 2,
wherein the compound having two or more ethylenically unsaturated groups is used in an amount of 0.15 to 2 parts by weight per 100 parts by weight of the α, β-unsaturated carboxylic acid, and wherein the compound having two or more ethylenically unsaturated groups is an allyl ether of a polyol selected from the group consisting of ethylene glycol, propylene glycol, diethylene glycol, dipropylene glycol, polyethylene glycol, polypropylene glycol, glycerol, polyglycerol, trimethylolpropane, pentaerythritol, saccharose and sorbitol.

2. A method for producing a carboxyl group-containing water-soluble polymer according to claim 1,
wherein the (meth)acrylic acid derivative is used in an amount of 0.01 to 10 parts by weight per 100 parts by weight of the α, β-unsaturated carboxylic acid.

3. A method for producing a carboxyl group-containing water-soluble polymer according to claim 1,
wherein the (meth)acrylic acid derivative is 3-(acryloyloxy)propionic acid.

4. A carboxyl group-containing water-soluble polymer as obtained by the production method according to claim 1, wherein a 0.2% by weight neutralized viscous solution derived from said carboxyl group-containing water-soluble polymer has a viscosity of 20000 to 50000 mPa·s.

5. A carboxyl group-containing water-soluble polymer as obtained by the production method according to claim 1, which has a median particle diameter of 75 to 500 µm.

6. A method for producing a carboxyl group-containing water-soluble polymer according to claim 2,
wherein the (meth)acrylic acid derivative is 3-(acryloyloxy)propionic acid.

7. A carboxyl group-containing water-soluble polymer as obtained by the production method according to claim 2, wherein a 0.2% by weight neutralized viscous solution derived from said carboxyl group-containing water-soluble polymer has a viscosity of 20000 to 50000 mPa·s.

8. A carboxyl group-containing water-soluble polymer as obtained by the production method according to claim 3, wherein a 0.2% by weight neutralized viscous solution derived from said carboxyl group-containing water-soluble polymer has a viscosity of 20000 to 50000 mPa·s.

* * * * *